United States Patent [19]

Mallon et al.

[11] Patent Number: 5,008,363
[45] Date of Patent: Apr. 16, 1991

[54] LOW TEMPERATURE ACTIVE ALIPHATIC AROMATIC POLYCARBODIIMIDES

[75] Inventors: Charles B. Mallon; Howard Chu, both of Belle Mead, N.J.

[73] Assignee: Union Carbide Chemicals and Plastics Technology Corporation, Danbury, Conn.

[21] Appl. No.: 497,925

[22] Filed: Mar. 23, 1990

[51] Int. Cl.$^5$ ............................................. C08F 8/30
[52] U.S. Cl. ..................................... 528/49; 525/123; 564/952
[58] Field of Search .......................... 528/49; 525/123; 564/252

[56] References Cited

U.S. PATENT DOCUMENTS

| | | |
|---|---|---|
| 2,853,473 | 9/1958 | Campbell et al. |
| 2,941,966 | 6/1960 | Campbell. |
| 2,941,983 | 6/1960 | Smeltz. |
| 3,450,562 | 6/1969 | Hoeschele. |
| 4,002,584 | 1/1977 | Takahashi et al. ..................... 528/49 |
| 4,055,522 | 10/1977 | Ashida et al. .......................... 528/49 |
| 4,487,964 | 12/1984 | Watson, Jr. et al. ................. 564/252 |
| 4,587,301 | 5/1986 | Watson, Jr. et al. ................. 525/123 |
| 4,587,964 | 5/1986 | Walker et al. ....................... 128/92 E |
| 4,820,863 | 4/1989 | Taylor. |

OTHER PUBLICATIONS

Campbell, T. W. et al., *J. Organic Chemistry*, vol. 28, pp. 2069–2075 (1963).
A New Method of Forming Peptide Bonds, Communications to the Editor, J. Chem. Soc., John C. Sheehan, Feb. 20, 1955, vol. 77, pp. 1067–1068.
High Polymers Containing the Carbodiimide Repeat Units, J. Organ. Chem., Campbell and Smeltz, Aug. 1963, vol. 28, pp. 2069–2075.
Carbodiimide Chemistry: Recent Advances, Chem. Rev., Williams & Ibrahim, 1981, vol. 81, pp. 589–636.

*Primary Examiner*—Morton Foelak
*Assistant Examiner*—Duc Devon
*Attorney, Agent, or Firm*—Henry H. Gibson

[57] ABSTRACT

A mixed aliphatic/aromatic polycarbodiimide prepared by first polymerizing an aliphatic isocyanate or mixture thereof, optionally in the presence of a polyfunctional isocyanate; arresting polymer chain growth by reaction with a stoichiometrically deficient amount of a monofunctional isocyanate-reactive compound, followed by further polymerization with an aromatic diisocyanate.

20 Claims, No Drawings

LOW TEMPERATURE ACTIVE ALIPHATIC AROMATIC POLYCARBODIIMIDES

BACKGROUND OF THE INVENTION

1. Field of the Invention

This invention relates to a class of aliphatic/aromatic mixed polycarbodiimides having good storage stability and particularly relates to a method for their preparation. This invention also pertains to the use of such mixed polycarbodiimides as low temperature active, e.g., "low bake", crosslinkers in aqueous, carboxyl-containing resins.

2. Description of Related Art

Carbodiimides are a well-known class of organic compounds. Dicyclohexylcarbodiimide has been used for many years as a condensation agent in the preparation of peptides, as described by Sheelan and Hess (J. Chem. Soc., 77, 1067 (1955)). Multifunctional, linear, polydisperse polycarbodiimides have been prepared by Campbell from diisocyanatoalkanes or diisocyanatoarenes using a phospholene oxide catalyst (U.S. Pat. No. 2,941,966 (1960)). The art is summarized in Chem. Rev., 81,589 (1981).

The use of polydisperse polycarbodiimides as cross-linkers for carboxylated latex resins and neutralized carboxylated water-soluble polymers is known in the art. Specifically, co-assigned U.S. application Ser. No. 691,378, filed Jan. 15, 1985 teaches the preparation of useful polycarbodiimide cross-linkers from certain mono-, di-, and tri-functional cycloaliphatic or saturated aliphatic isocyanates. Unfortunately, the raw materials used to prepare the aliphatic materials are quite expensive.

Urethane-terminated polycarbodiimides, obtained by polymerizing a diisocyanate in the presence of a carbodiimide-forming catalyst and reacting the isocyanato-terminated polymer with an alcohol, are described in U.S. Pat. No. 2,941,983 and in J. Organic Chemistry 28, 2069, (1963). All but Example 6 of U.S. Pat. No. 2,941,983 employs an equal molar amount of the diisocyanate and alcohol. In Example 6, 0.2 mol of toluene-2,4-diisocyanate is polymerized and then chain terminated using 0.14 mol of benzyl alcohol. The former reference also suggests using amines for chain growth termination; while the latter reference also discusses the production of corresponding polycarbodiimides which are terminated by reacting the isocyanato-terminated polycarbodiimide with a monoisocyanate so that the polymer contains only carbodiimide linkages. A polycarbodiimide of this type, derived from toluene diisocyanate and terminated by reaction with p-chlorophenyl isocyanate (molar ratio of diisocyanate to monoisocyanate=58), is specifically exemplified. In addition, the formation of a polycarbodiimide of unspecified molecular weight from methylenebis (phenyl isocyanate) and p-tolylisocyanate (molar ratio of diisocyanate in monoisocyanate not specified) is postulated but no preparative details or properties are given.

U.S. Pat. No. 3,450,562 teaches, in broad terms, the preparation of chain terminated polycarbodiimides by reacting, either sequentially or simultaneously, a diisocyanate and a monoisocyanate, monoalcohol or primary amine in the presence of a carbodiimide-forming catalyst. In Example I, a polymerized product of a mixture of toluene-2,4-diisocyanate and toluene-2,6-diisocyanate is chain terminated with isopropyl alcohol. In Example III, aniline is used to terminate chain growth. Example VIII of this patent shows the preparation of two mono-isocyanated terminated polycarbodiimides. The first one, polycarbodiimide 1, is obtained by heating a mixture of toluene diisocyanate and o-tolylisocyanate (in a molar ratio of 1:1) with a carbodiimide-forming catalyst. The second one, polycarbodiimide 2, is obtained by heating methylenebis (cyclohexyl isocyanate) in the presence of a carbodiimide-forming catalyst and then reacting the isocyanate-terminated polymer with cyclohexyl isocyanate. The molar ratio of diisocyanate to monoisocyanate is 1.5:1.

Co-assigned U.S. Pat. Nos. 4,487,964 and 4,587,301 disclose the preparation of useful polycabodiimide cross-linkers from mixed aromatic/aliphatic isocyanates. According to these patents, a mixed aliphatic-/aromatic polycarbodiimide can be prepared by simply reacting a mixture of aliphatic mono- and diisocynates in the presence of a phospholene oxide catalyst followed, in sequence, by the addition of and further reaction with aromatic mono- or diisocyanates under similar reaction conditions. Both reactions are conducted at a temperature of about 120° to 180° C. and the various reactants are used in amounts to provide a molar ratio of mono- and diisocyanate reactants between about 2:1 to 2:10 and a molar ratio of aliphatic to aromatic isocyanate groups in the reactants between about 0.5:1 to 2:1.

Although this prior invention provided some improvement in polycarbodiimide resin storage stability relative to the then-existing art, excessive viscosity development and gellation over prolong storage, e.g., 6 months or longer, remains a problem in mixed polycarbodiimide resins. Due to the low level that these crosslinking materials generally are used in coating formulations, it is not uncommon for formulators to maintain these materials in inventory for that period of time. A more glaring disadvantage of this prior art invention concerns its use of monoisocyanates. The high toxicity and volatility of these materials makes them very hazardous and creates significant problems to ensure their safe handling and use.

It now has been discovered that by constructing a certain polymer structure, for example, by using a particular reaction sequence and a particular molar ratio of reactants, a mixed aliphatic/aromatic polycarbodiimide of improved storage stability can be prepared. Importantly, this result can be achieved without using hazardous monoisocyanates. Surprisingly, the mixed polycarbodiimide resins of the present invention also provide solvent resistance properties to crosslinked resins similar to polycarbodiimide resins made solely from aliphatic isocyanates.

DISCLOSURE OF THE INVENTION

The present invention is directed to a novel class of storage stable mixed aliphatic/aromatic polycarbodiimides useful for crosslinking aqueous carboxyl-containing resins. The polycarbodiimides of the present invention are made by polymerizing aliphatic and aromatic diisocyanates in specific proportions and in a particular sequence. During the polymerization process, partially polymerized adducts of the aliphatic diisocyanates are reacted with a well-defined quantity of a monofunctional isocyanate-reactive compound which acts as a chain terminator to limit the extent of the polycarbodiimide-forming polymerization reaction.

In one aspect, the present invention is directed to a method of preparing mixed aliphatic and aromatic polycarbodiimides which comprises (a) polymerizing a saturated aliphatic diisocyanate, or a saturated cycloaliphatic diisocyanate or a mixture thereof, optionally containing a polyfunctional isocyanate, in the presence of a polycarbodiimide polymerization catalyst to form a polycarbodiimide intermediate having free isocyanate groups, (b) reacting said polycarbodiimide intermediate with a monofunctional isocyanate-reactive compound or mixture thereof in an amount insufficient to react with all of said free isocyanate groups, and (c) further reacting said polycarbodiimide intermediate in the presence of an aromatic diisocyanate and said catalyst under carbodiimide-forming conditions until essentially all of the isocyanate groups are depleted.

In another aspect, the present invention is directed to storage stable mixed aliphatic and aromatic polycarbodiimides prepared by (a) polymerizing a saturated aliphatic diisocyanate, or a saturated cycloaliphatic diisocyanate or a mixture thereof, optionally containing a polyfunctional isocyanate, in the presence of a polycarbodiimide polymerization catalyst to form a polycarbodiimide intermediate having free isocyanate groups, (b) reacting said polycarbodiimide intermediate with a monofunctional isocyanate-reactive compound or mixture thereof in an amount insufficient to react with all of said free isocyanate groups, and (c) further reacting said polycarbodiimide intermediate in the presence of an aromatic diisocyanate and said catalyst under carbodiimide-forming conditions until essentially all of the isocyanate groups are depleted.

In further aspects, the present invention is directed to the use of these mixed polycarbodiimides for cross-linking aqueous carboxyl-containing resins and to mixtures of aqueous carboxyl-containing resins and the mixed aliphatic/aromatic polycarbodiimides of the present invention.

As used herein, all defined groups are intended to include such groups containing any substitution which does not significantly interfere with the preparation or use of the carbodiimides for their intended purpose.

In carrying out the process of the present invention any saturated aliphatic diisocyanate or saturated cycloaliphatic diisocyanate may be used for preparing the polycarbodiimide intermediate. While these aliphatic diisocyanates may contain other substituents, suitable substituents should not be reactive with isocyanate groups. For example, substituents should not contain active hydrogens as determined by the Zerewitinoff test. [J. Am. Chem. Soc. 49,3181 (1927)]

Saturated aliphatic diisocyanates containing from 1 to about 18 carbon atoms, and saturated cycloaliphatic diisocyanates containing up to about 18 carbon atoms, wherein the cycloaliphatic moieties contain from about 5 to 7 carbon atoms are preferred for use in the present invention. Suitable saturated aliphatic and saturated cycloaliphatic diisocyanates for preparing the mixed polycarbodiimides of the present invention include isophorone diisocyanate, 1,6-hexane diisocyanate, dicyclohexylmethane diisocyanate, trimethylene diisocyanate 1,4-tetramethylene diisocyanate, decamethylene diisocyanate, 1,12-dodecane diisocyanate, cyclohexane diisocyanates, cyclobutane-1,3-diisocyanate, and hexahydrotolylene-2,4 and 2,6-diisocyanates.

It is a feature of the present invention that the aliphatic diisocyanate or mixture thereof may optionally include a polyfunctional isocyanate, i.e. a polyisocyanate. As used herein, polyfunctional isocyanates include those aliphatic isocyanates containing an average number of isocyanate moieties above 2. As will be demonstrated in subsequent examples, the amount of polyfunctional isocyanate optionally used in preparing polycarbodiimides in accordance with the present invention should be limited to avoid excessive crosslinking and gellation during polycarbodiimide preparation. Preferably, the amount of polyfunctional isocyanate should be limited so that such reactants contribute less than about 35 mol % of the total isocyanate moieties to the formation of the polycarbodiimide product, and preferably less than about 25 mol %.

In accordance with the process of the present invention the saturated aliphatic or cycloaliphatic diisocyanate or mixture thereof, optionally containing a small amount of a polyfunctional isocyanate, is self-addition polymerized in the presence of a catalytic amount of a carbodiimide-forming, i.e., isocyanate addition, catalyst. Carbodiimide-forming catalysts which are employed in preparing the mixed polycarbodiimides of the present invention can be any of the polycarbodiimide polymerization catalysts employed in the art to convert organic isocyanates to carbodiimides. Catalysts which are useful in preparing the polymers of the present invention include phospholines, phospholine oxides and sulfides, phospholidines and phospholidine oxides and sulfides. The phospholine oxides and sulfides are described in U.S. Pat. Nos. 2,663,737 and 2,663,738. The phospholidine oxides are described in U.S. Pat. No. 2,663,739. The corresponding phospholines and phospholidines may be prepared by a lithium aluminum hydride reduction of the corresponding dichloro phospholine or phospholidine. These dichloro compounds are also used to prepare the above mentioned oxides and sulfides and are described in U.S. Pat. No. 2,663,736.

Particularly useful classes of carbodiimide-forming catalysts are the phospholene-1-oxides and phospholene-1-sulfides. Representative compounds within these classes are 3-methyl-1-phenyl-3-phospholine 1-oxide, 1-ethyl-phenyl-3-phospholine 1-oxide, 3-(4-methyl-3-pentynyl)-1-phenyl-3-phospholine 1-oxide, 3-chloro-1-phenyl-3-phospholine 1oxide, 1,3-diphenyl-3-phospholine 1-oxide, 1-ethyl-3-phospholine 1-sulfide, 1-phenyl-3-phospholine 1-sulfide, and 2-phenyliso-phosphindoline 2-oxide, 1-phenyl-2-phospholene 1-oxide, 3-methyl-phenyl-2-phospholene 1-oxide, 1-phenyl-2-phospholene 1-sulfide, 1-ethyl-2-phospholene 1-oxide, 1-ethyl-3-methyl-2-phospholene 1-oxide, 1-ethyl-3-methyl-2-phospholene 1-oxide. Other isomeric phospholenes corresponding to all the above-named compounds also can be used.

The amount of carbodiimide-forming catalyst employed in the preparation of the mixed polycarbodiimides is generally within the range of about 0.001 to about 0.03 mol per mol of aliphatic diisocyanate but higher or lower amounts can be employed depending upon the activity of the particular catalyst chosen. Normally, an amount between about 0.003 to 0.01 mol of catalyst per mol of aliphatic diisocyanate should be sufficient. A particular advantage of the present invention is that, relative to commercial prior art procedures, preparation of the ultimate polycarbodiimide product of this invention is obtained in a shorter time period with the same or a lower level of polycarbodiimide polymerization catalyst.

The initial polycarbodiimide polymerization reaction generally is conducted under atmospheric pressure conditions at a temperature between about 125° to 160° C., perferably at a temperature of about 145° C. Higher temperatures can be used to reduce the reaction time but may result in undersired amounts of by-products; while lower temperatures significantly prolong the reaction period. Although superatmospheric or subatmospheric pressures can be used, it is preferred to use atmospheric pressures for economic reasons. The reaction mixture is stirred, and a small amount of nitrogen can be sparged into the reaction medium to assist in driving the reaction to completion by removal of carbon dioxide. These conditions are referred to throughout the specification and claims as "carbodiimide-forming conditions".

The polymerization reaction is conducted until the desired degree of polymerization i.e., an average carbodiimide functionality of about 2 to 3, has occurred, e.g., when using isophorone diisocyanate as the aliphatic diisocyanate the reaction is continued until the polymerized polycarbodiimide intermediate product attains a molecular weight of about 650–850. Under the above-noted reaction conditions, the reaction is conducted for about 1 to about 3 hours, preferably for about 2 hours. As used herein, "molecular weight" refers to number average molecular weight, while "average carbodiimide functionality" refers to the average number of carbodiimide linkages in the polymerized polycarbodiimide intermediate per molecule.

Because the resulting polycarbodiimide intermediate has free (terminus) isocyanate groups, and because the weight fraction of free isocyanate groups in the polycarbodiimide intermediate is indicative of the extent of polymerization, the polymerization reaction can be monitored using an isocyanate titration. Using the procedure described in ASTM D-1638-74, the weight fraction of free isocyanate groups in the intermediate product can be determined. When using isophorone diisocyanate as the aliphatic diisocyanate (equivalent weight of 111.14), the initial polymerization should be continued until the polycarbodiimide intermediate exhibits a weight percent of free isocyanate groups (—NCO) of between about 5 and 20% by weight, and preferably between about 10 and 15% by weight. For other aliphatic and cycloaliphatic diisocyanates the weight fraction of free isocyanate groups will vary as a function of the change in equivalent weights of the isocyanate reactants.

As the organic polycarbodiimide intermediate is formed, carbon dioxide is liberated and this carbon dioxide generally is vented from the reaction medium. The extent of the reaction also can be determined by measuring the amount of carbon dioxide which is evolved; one mol of carbon dioxide is evolved in the formation of each molar equivalent of carbodiimide. The amount of the carbon dioxide given off during the reaction can be continually determined, for example, by passing the gas through a suitable absorption column which is attached to a balance. The weight of this carbon dioxide can be correlated with the progress of the polymerization by reference to a working plot of molecular weight attained vs. weight of carbon dioxide evolved for the diisocyanate in question. When the amount of carbon dioxide evolved corresponds to the formation of the required number of carbodiimide groups or linkages, the reaction can be terminated. The reaction is effectively terminated in accordance with the present invention by cooling the polymerization product to a temperature below about 120° C., preferably to a temperature of about 110° C. and adding the monofunctional isocyanate reactive compound.

The first polymerization step of the present invention may be carried out in bulk or in solution depending on the particular organic aliphatic isocyanate being used. Thus, when the aliphatic isocyanate is a solid, it may be dissolved in an inert solvent and the appropriate amount of phosphorus-containing catalyst added. An inert solvent is one that does not contain any groups reactive with isocyanates or with itself under the conditions of the polycarbodiimide polymerization reaction. In general, solvents which contain active hydrogen atoms as determined by the Zerewitinoff procedure should be avoided. The solvent should readily dissolve both the diisocyanate and the monofunctional isocyanate-reactive compound used as the chain-stopper. Furthermore, it should maintain the polymeric carbodiimide in solution during the polymerization.

Suitable non-reactive (inert) solvents include aromatic hydrocarbons having 6 to about 12 carbons, such as benzene, toluene, the xylenes, ethyl benzene, isopropyl benzene, and mesitylene. Also suitable are cyclopentane, n-hexane, cyclohexane, n-heptane, methyl cyclohexane, tetramethylethylene diisobutylene, chlorobenzene, methylene chloride, ethylidene chloride, chloroform, carbon tetrachloride, ethylene chloride, methylene bromide, o-dichlorobenzene, chloromethylether, isopropylether, dioxane, tetrahydrofuran, pyridine aliphatic esters or glycol diesters, and glycol ether esters. Additional exemplary solvents include; ethylbutylketone, acetophenone, propiophenone, diisobutylketone, cyclohexanone, N-methyl pyrrolidone, decalin, methyl CELLOSOLVE acetate, CELLOSOLVE acetate, butyl CELLOSOLVE acetate, CARBITOL acetate, butyl CARBITOL acetate, glycoldiacetate, amyl acetate, glycolether diacetate, dipropylene glycol ether dibutyrate, and hexylene glycol monomethyl ether acetate. In the cases where the aliphatic isocyanate reactant itself is a liquid, the use of an inert solvent is not normally necessary. In this case, the phosphorus-containing catalyst is added directly to the aliphatic isocyanate, whereupon the entire mass is converted to the organic polycarbodiimide intermediate.

Any compound having only one moiety reactive with isocyanate groups can broadly be used as the monofunctional isocyanate-reactive compound for terminating the isocyanate addition polymerization in accordance with the present invention. Monofunctional, active hydrogen-containing compounds such as primary and secondary mono-alcohols, primary and secondary amines and mono-acids containing no other substituents reactive with isocyanates are particularly useful in this invention. Relative to the monoisocyanates, these materials are safe and easy to handle.

Suitable active hydrogen-containing compounds include, alcohols such as the alkanols having 1 to 10 carbon atoms, e.g., methyl alcohol, ethyl alcohol, isopropyl alcohol, n-butyl alcohol, sec-butyl alcohol, isoamyl alcohol, n-hexanol, cyclohexanol, 2-chloro-1-propanol, and 2-octanol; benzyl alcohol; glycol mono ethers and glycol mono esters, e.g. diethylene glycol mono-n-butyl ether; alkoxy-capped polyalkylene glycols, e.g., methoxy polyethylene glycols,; and aliphatic and dialiphatic amines, e.g., dibutyl amine.

Although not preferred from a safety perspective, aliphatic and aromatic mono-isocyanates also can be used as the monofunctional isocyanate-reactive compound according to the broad practice of the present invention. Suitable monoisocyanates include butyl isocyanate, phenyl isocyanate, hexyl-phenyl isocyanates, methoxy-phenyl isocyanates and the like.

For best results, the alcohol, amine or isocyanate or mixture thereof selected as the polymerization chain-stopper should have a boiling point above the temperature at which the reaction is being conducted.

The monofunctional isocyanate-reactive compound or mixture thereof is reacted with the diisocyanate self-addition polycarbodiimide intermediate polymer in an amount insufficient to consume or deplete all the free-isocyanate groups of said polymer. For linear polycarbodiimides, the monofunctional isocyanate-reactive compounds typically are supplied in an amount to provide between about 0.2 to about 0.9 mol, and most preferably between about 0.3 and about 0.7 mol of monofunctional isocyanate reactive compound per mol of isocyanate moiety ultimately used for preparing the mixed aliphatic/aromatic polycarbodiimide product, i.e. including both the aliphatic and aromatic diisocyanates.

The termination reaction preferably is conducted at a temperature of between about 100° to 120° C., preferably at about 110° C. until completion, i.e., until essentially all of the monofunctional reactants are consumed. At these reduced temperatures, further self-addition polymerization of the polycarbodiimide intermediate and other isocyanates becomes quite slow. Consequently, the lower temperatures favor the termination reaction, especially those involving alcohol and amine monofunctional isocyanate-reactive compounds and further self-addition polymerization effectively ends. Careful temperature control at this stage is important for preventing an over-advancement of the initially polymerized polycarbodiimide intermediate. In commercial operations where rapid cooling of large reactors by indirect means is difficult, one can take advantage of the heat capacity of the various reactants (e.g. monoalcohols) and solvents to effect quick cooling by adding them rapidly to the reaction media.

It is a preferred feature of the present invention that an alkoxy-capped poly(alkylene oxide) comprise at least a portion of the monofunctional isocyanate-reactive compound. In this way, the self-emulsifying property of the resulting polycarbodiimides is greatly enhanced. By improving the emulsifying behavior of the polycarbodiimide, its utility as a crosslinker for aqueous carboxyl-containing resin systems is significant improved.

Suitable alkoxy-capped poly(alkylene oxides) are described in U.S. Pat. No. 4,820,863, the disclosure of which is hereby incorporated by reference. Such alkoxy-capped polymers are well known in the art and can be readily prepared using familiar procedures. Useful polymers of this type include those described by the generic formula: R—$(OCH_2CH_2)_n$—OH, wherein R is a $C_1$-$C_6$ alkyl, preferably a $C_1$-$C_4$ alkyl, and n is about 4 to about 20, preferably about 8 to about 17. The degree of alkoxylation should be as close to 100 mole percent as possible. Various commercially available materials may be employed. For example, one may advantageously use those methoxy-capped poly(ethylene oxide) resins available from Union Carbide Corp. under the trade designation "CARBOWAX MPEG." Such materials are available in broad range of molecular weights. For purposes of this invention, the preferred molecular weight (weight average) range is about 300 to about 1,000, preferably about 350 to about 750.

The total weight of alkoxy-capped e.g., (methoxy) polyethylene glycol to the total weight of monofunctional isocyanate-reactive compounds should range from about 10 to about 50 weight percent. In order to obtain a good balance between dispersibility and functionality, the preferred range should be from about 20 to about 40 weight percent. However, if a product is to be used in solvent based systems, rather than with an aqueous resin, no alkoxy-capped polyethylene glycol would be needed.

The reaction between the diisocyanate self-addition polymer or polycarbodiimide intermediate and the monofunctional isocyanate-reactive compounds typically is conducted in an inert solvent. Again, the choice of solvent is not critical. However, the boiling point of the solvent should be at least about 130°-160° C. to accommodate both this termination reaction and the subsequent completion of the polycarbodiimide polymerization reaction described below.

The quantity of solvent used also is not critical, but should be sufficient to keep the product in a fluid state. As a guideline, it is recommended that sufficient solvent be used to produce between about a 40 and 60% solids concentration in the reaction media, as it may be necessary to remove the solvent by vaporization or other energy-intensive procedure before the polycarbodiimide can be used. The solvent must not contain active hydrogen functionality such as would react with the isocyanate materials or the ultimate carbodiimide product.

As noted above, the ratio of the total moles of monofunctional isocyanate-reactive compound to the total moles of isocyanate functional groups in the reactants used to prepare the polycarbodiimide product should range from about 0.2 to about 0.9. The preferred range is from about 0.25 to about 0.9, with between about 0.3 and 0.7 most preferred for linear polycarbodiimides. Any composition with a ratio higher than about 0.9 is not going to produce any noticeable effect in improving the solvent resistance. On the other hand, any composition with a ratio lower than about 0.2 is likely to gel.

Once the termination reaction phase is essentially complete, the reaction temperature is again increased to within the range of 125° to 160° C., preferably to about 150° C. to convert any residual isocyanates to carbodiimides. The termination reaction should take about 0.5 to 3.0 hours to reach completion. Neglecting the time needed to heat and cool the reactants and the periods of addition, the total reaction period will normally be between about 10 to 15 hours. At some point prior to initiating this final polymerization phase, an aromatic diisocyanate or a mixture thereof is added to the reaction medium. The aromatic diisocyanate typically can be added either at the same time as the monofunctional isocyanate-reactive compound is added to the polycarbodiimide intermediate or at any point thereafter, up to when self-addition polymerization conditions are re-established.

As before, the progress of the final polymerization phase can be followed by monitoring carbon dioxide ($CO_2$) evolution. Once $CO_2$ evolution essentially ceases, the reaction is over. For convenience the final polymerization phase is conducted in the same solvent employed during the termination phase.

Aromatic diisocyanates useful in preparing the polycarbodiimides of the present invention include 4,4'-diisocyanotodiphenylmethane, the toluene diisocyanates, naphthalenediisocyanates, and m-phenylene diisocyanate. The aromatic nucleus can be substituted with substituents which are inert to the carbodiimide linkages, including alkyl, cycloalkyl, aryl, aralkyl, alkoxy, aryloxy, unsaturated groups such as vinyl, allyl, butenyl groups, halogen particularly fluorine or chlorine, nitrile, nitro groups and the like. The aromatic diisocyanate is supplied in an amount to provide up to about 0.6 mol of aromatic diisocyanate per mol of aliphatic diisocyanate and preferably between about 0.2 to 0.5 mols of aromatic diisocyanate per mole of aliphatic diisocyanate or higher functionality aliphatic isocyanate.

Incorporating a proper amount of aromatic diisocyanate in preparing the mixed aliphatic/aromatic polycarbodiimide improves the chemical resistance of the polycarbodiimide product. An excess amount of aromatic diisocyanate, on the other hand contributes to gelation. The total weight of aromatic diisocyanate to the total weight of reactants generally will be from about 1 to about 25 percent. For improved performance as well as an extended shelf life, the preferred amount of aromatic diisocyanate typically is from about 10 to about 20 wt %.

It has been discovered that the stability of a mixed aliphatic/aromatic polycarbodiimide is related to (i) its average number of carbodiimide groups per molecule, or in other words the number of mols of carbodiimide groups in a mol of the polycarbodiimide polymer product defined as its functionality, and (ii) its content of aromatic diisocyanates. As recognized by those skilled in the art, polycarbodiimides made in accordance with the present invention will contain a distribution of molecules of differing molecular weights and each molecule will have a particular distribution of moieties contributed by reactions between the aliphatic and aromatic isocyanates, the polyfunctional isocyanates and between the isocyanates and the monofunctional isocyanate-reactive compounds. The resulting products of different molecular weights are relatively difficult to separate and are normally employed as a mixture. In this case, the functionality or number of carbodiimide groups per molecule is specified as an average, thus the functionality of a compound having two carbodiimide groups is 2; an equimolar mixture of a polycarbodiimide having two carbodiimide groups with a polycarbodiimide having three carbodiimide groups would have a functionality of 2.5; polymers having an average functionality of at least two are suitable for the practice of this invention. The theoretical functionality of polycarbodiimaide product which is a useful approximation of its actual functionality can be calculated from the reactants used during its preparation by the following formula:

$$\text{functionality} = \frac{[\text{mols of isocyanate}] - [\text{mols of active-H}]}{[\text{mols of monofunctional}] - [\text{mols of polyfunctional}]}$$

where:
mols of isocyanate = the total number of mols of isocyanate moieties in the polycarbodiimide reactants mols of active-H = the total number of mols of active hydrogens in the polycarbodiimide reactants mols of monofunctional = the total number of mols of monofunctional isocyanate-reactive compounds in the polycarbodiimide reactants mols of polyfunctional = the total number of mols of polybodiimide reactants having three isocyanate groups The preferred functionality range for a linear carbodiimide which is composed of difunctional isocyanates only, is from about 2.0 to about 7.1; whereas the preferred functionality range for non-linear carbodiimides containing polyfunctional, e.g., trifunctional, isocyanate, depends upon the percentage of polyfunctional, e.g., trifunctional, groups. For example, with 5 wt. % trifunctional isocyanate, the preferred functionality range is about 2.0 to about 6.5, it is about 2.0 to about 5.6 for a level of 15 percent trifunctional group, and it is about 2.0 to about 5.3 for a level of 25% triisocyanate. In other words, as the level of multi-functional isocyanate is increased, the upper limit on the preferred range of polycarbodiimide functionality is decreased. As a result of the combination of these preferred functionality ranges, a preferred range of the total moles of monofunctional isocyanate-reactive compound to the total moles of isocyanate is as noted above from about 0.2 to about 0.9.

The resin systems in which the polycarbodiimide crosslinkers of the present invention are particularly useful are those in which the resins contains reactive carboxyl groups, such as are typically found in aqueous latexes, aqueous polyurethane dispersions, or neutralized carboxylated water-soluble resins and carboxylated solution resins, which may for example be used for coatings. The polycarbodiimides will also be useful in such carboxyl-containing resin systems as polyesters, acrylics, epoxies and alkyds. All of these resins are intended to be embraced by the phrase "carboxyl-containing".

The polycarbodiimides of the present invention are added as crosslinkers for such carboxyl-containing resins in an amount between about 0.5 to about 30 parts per 100 parts by weight of the carboxyl-containing resin.

EXAMPLES OF PREPARATION OF CARBODIIMIDES

Nineteen examples (Examples 1-19) are presented hereafter illustrating the preparation of various polycarbodiimides. In connection with Example I, examples 1-17 demonstrate (1) the effect of the amount of aromatic diisocyanate (TDI) (examples 1-3, 5-8 and 13-17), (2) the effect of the monofunctional isocyanat-reactive compound to total isocyanate ratio (examples 4, 11, 13, 14 and 17), (3) the effect of various amounts of optional MPEG (every example) and (4) the effect of various amounts of optional multifunctional isocyanate monomer (examples 9-12) on the use of these polycarbodiimide as crosslinkers for aqueous carboxyl-containing resins. The resulting polycarbodiimide products of examples 1-17 were tested as crosslinkers in a standard carboxyl-containing aqueous latex formulation for their effect on solvent resistance. The results of the examples are summarized in Tables 1 and 2.

EXAMPLE 1

181.5 g isophorone diisocyanate (IPDI) and 14.3 g of a 10% solution of 3-methyl-1-phenyl-2-phospholene-1-oxide in xylene were placed into a 1-liter, 4-neck round-bottom flask which was equipped with a heating mantle, thermometer, condenser, nitrogen sparge and mechanical stirrer. The mixture was heated with stirring and nitrogen sparge at 145° C. After 2 hours reaction, a mixture of 15.7 g n-butanol (BuOH), 116.5 g methoxy polyethylene glycol 350 (MPEG 350), and 234.0 g propylene glycol monomethyl ether acetate was charged into the flask, corresponding to about 0.24 mol of monofunctional isocyanate-reactive compound per mol of isocyanate moiety. Then a mixture of 56.9 g toluene diisocyanate (TDI) and 130.0 g propylene glycol monomethyl ether acetate was added. The reaction temperature was held at 110° C. for 1 hour and then reheated to 150° C. The reaction was completed after 8 additional hours at 150° C. The product had a solids content of 51.0%, a viscosity of 50 cps., and a color of 6 using a Gardner Hellige Comparator.

EXAMPLE 2

167.5 g isophorone diisocyanate and 11.0 g of a 10% solution of 3-methyl-1-phenyl-2-phospholene-1-oxide in xylene were placed into a 1-liter, 4-neck, round-bottom flask which was equipped with a heating mantle, thermometer, condenser, nitrogen sparge and mechanical stirrer. The mixture was heated with stirring and nitrogen sparge at 145° C. After 2.5 hours reaction, a mixture of 12.1 g n-butanol, 89.6 g methoxy polyethylene glycol 350, and 180.0 g propylene glycol monomethyl ether acetate was charged into the flask. Then a mixture of 21.9 g toluene diisocyanate and 100.0 g propylene glycol monomethyl ether acetate was added. The reaction temperature was held at 110° C. for 1.5 hours and then reheated to 150° C. The reaction was completed after 10 additional hours at 150° C. The product had a solids content of 49.0%, a viscosity of 36 cps., and a color of 4 using a Gardner Hellige Comparator.

EXAMPLE 3

139.6 g isophorone diisocyanate and 10.0 g of a 10% solution of 3-methyl-1-phenyl-2-phospholene-1-oxide in xylene were placed into a 1-liter, 4-neck, round-bottom flask which was equipped with a heating mantle, thermometer, condenser, nitrogen sparge and mechanical stirrer. The mixture was heated with stirring and nitrogen sparge at 145° C. After 2.5 hours reaction, a mixture of 12.1 g n-butanol, 89.6 g methoxy polyethylene glycol 350, and 160.0 g propylene glycol monomethyl ether acetate was charged into the flask. Then a mixture of 55.8 g isophorone diisocyanate and 100.0 g propylene glycol monomethyl ether acetate was added. The reaction temperature was held at 110° C. for 1.5 hours and then reheated to 150° C. The reaction was completed after 12 additional hours at 150° C. The product had a solids content of 52.9%, a viscosity of 45 cps., and a color of 2 using a Gardner Hellige Comparator.

EXAMPLE 4

139.6 g isophorone diisocyanate and 10.0 g of a 10% solution of 3-methyl-1-phenyl-2-phospholene-1-oxide in xylene were placed into a 1-liter, 4-neck, round-bottom flask equipped with a heating mantle, thermometer, condenser, nitrogen sparge and mechanical stirrer. The mixture was heated with stirring and nitrogen sparge at 145° C. After 2.5 hours reaction, a mixture of 21.5 g n-butanol, 96.0 g methoxy polyethylene glycol 750 (MPEG 750), and 160.0 g propylene glycol monomethyl ether acetate was charged into the flask, corresponding to about 0.2 mol of monofunctional isocyanate-reactive compound per mol of isocyanate moiety. Then a mixture of 72.9 g toluene diisocyanate and 100.0 g propylene glycol monomethyl ether acetate was added. The reaction temperature was held at 110° C. for 1.5 hours and then reheated to 150° C. The reaction was completed after 10 additional hours at 150° C. However, the product was not stable and gelled in a few days.

EXAMPLE 5

139.6 g isophorone diisocyanate and 11.0 g of a 10% solution of 3-methyl-1-phenyl-2-phospholene-1-oxide in xylene were placed into a 1-liter, 4-neck, round-bottom flask equipped with a heating mantle, thermometer, condenser, nitrogen sparge and mechanical stirrer. The mixture was heated with stirring and nitrogen sparge at 145° C. After 2.0 hours reaction, a mixture of 21.5 g n-butanol, 96.0 g methoxy polyethylene glycol 750, and 160.0 g propylene glycol monomethyl ether acetate was charged into the flask. Then a mixture of 43.8 g toluene diisocyanate and 120.0 g propylene glycol monomethyl ether acetate was added. The reaction temperature was held at 110° C. for 1.5 hours and then reheated to 150° C. The reaction was completed after 10 additional hours at 150° C. The product had a solids content of 54.9%, a viscosity of 150 cps. and a color of 6 using a Gardner Hellige Comparator.

EXAMPLE 6

167.5 g isophorone diisocyanate and 11.0 g of a 10% solution of 3-methyl-1-phenyl-2-phospholene-1-oxide in xylene were placed into a 1-liter, 4-neck, round-bottom flask equipped with a heating mantle, thermometer, condenser, nitrogen sparge and mechanical stirrer. The mixture was heated with stirring and nitrogen sparge at 145° C. After 2.5 hours reaction, a mixture of 21.5 g n-butanol, 96.0 g methoxy polyethylene glycol 750 and 180.0 g propylene glycol monomethyl ether acetate was charged into the flask. Then a mixture of 21.9 g toluene diisocyanate and 100.0 g propylene glycol monomethyl ether acetate was added. The reaction temperature was held at 110° C. for 1.5 hours and then reheated to 150° C. The reaction was completed after 10 additional hours at 150° C. The product had a solids content of 50.2%, a viscosity of 45 cps. and a color of 4 using a Gardner Hellige Comparator.

EXAMPLE 7

72.9 g toluene diisocyanate, 21.5 g n-butanol and 96.0 g methoxy polyethylene glycol 750 were placed into a 1-liter, 4-neck, round-bottom flask equipped with a heating mantle, thermometer, condenser, nitrogen sparge and mechanical stirrer. The mixture was heated with stirring and nitrogen sparge at 100° C. for 1 hour. Then 275.0 g propylene glycol monomethyl ether acetate was charged into the flask and this solution was removed for later usage. 139.6 g isophorone diisocyanate and 11.7 g of a 10% solution of 3-methyl-1-phenyl-2-phospholene-1-oxide in xylene were placed into the same apparatus and held at 145° C. for 1 hour. Then the previously prepared mixture of TDI, n-butanol and methoxy polyethylene glycol was added slowly to the flask in a dropping funnel over a 30-minute period. The reaction temperature was held at 145° C. to cook out the reaction; however, the reaction mixture gelled after 18 hours.

EXAMPLE 8

153.2 g isophorone diisocyanate, 32.9 g toluene diisocyanate and 180.0 g propylene glycol monomethyl ether acetate were placed into a 1-liter, 4-neck, round bottom flask equipped with a heating mantle, thermometer, condenser, nitrogen sparge and mechanical stirrer. Then a mixture of 21.6 g n-butanol, 96.0 g methoxy polyethylene glycol 750 and 100.0 g propylene glycol monomethyl ether acetate was charged into the flask slowly. The reaction was heated to 115° C. for 2 hours, then 11.0 g of a 10% 3-methyl-1-phenyl-2-phospholene-1-oxide in xylene was added to the flask. Finally, the reaction was heated to 150° C. and held at that temperature for 20 hours. The product had a solids content of 53.8%, a viscosity of 44 cps. and a color of 6 using a Gardner Hellige Comparator.

EXAMPLE 9

120.9 g isophorone diisocyanate, 56.8 g DESMODUR N-3200 aliphatic polyisocyanate (N-3200) reported to have an equivalent weight of about 180 and 10.0 g of a 10% solution of 3-methyl-1-phenyl-2-phospholene-1-oxide in xylene were placed into a 1-liter, 4-neck, round-bottom flask equipped with a heating mantle, thermometer, condenser, nitrogen sparge and mechanical stirrer. The mixture was heated with stirring and nitrogen sparge at 145° C. After 1.5 hours reaction, a mixture of 21.5 g n-butanol, 96.0 g methoxy polyethylene glycol 750 and 180.0 g propylene glycol monomethyl ether acetate was charged into the flask. Then a mixture of 12.9 g toluene diisocyanate and 100.0 g propylene glycol monomethyl ether acetate was added. The reaction temperature was held at 110° C. for 1.0 hour and then reheated to 150° C. The reaction was completed after 10 additional hours at 150° C. The product had a solids content of 53.1%, a viscosity of 290 cps. and a color of 3 using a Gardner Hellige Comparator.

EXAMPLE 10

93.1 g isophorone diisocyanate, 75.9 g DESMODUR N-3200 aliphatic polyisocyanate and 11.0 g of a 10% solution of 3-methyl-1-phenyl-2-phospholene-1-oxide in xylene were placed into a 1-liter, 4-neck, round-bottom flask equipped with a heating mantle, thermometer, condenser, nitrogen sparge and mechanical stirrer. The mixture was heated with stirring and nitrogen sparge at 145° C. After 2.0 hours reaction, the viscosity increased and later gelled.

EXAMPLE 11

104.4 g isophorone diisocyanate, 56.8 g DESMODUR N-3200 aliphatic polyisocyanate and 9.0 g of a 10% solution of 3-methyl-1-phenyl-2-phospholene-1-oxide in xylene were placed into a 1-liter, 4-neck, round-bottom flask equipped with a heating mantle, thermometer, condenser, nitrogen sparge and mechanical stirrer. The mixture was heated with stirring and nitrogen sparge at 145° C. After 2.0 hours reaction, a mixture of 12.1 g n-butanol, 89.6 g methoxy polyethylene glycol 350 and 180.0 g propylene glycol monomethyl ether acetate was charged into the flask. Then a mixture of 36.8 g toluene diisocyanate and 100.0 g propylene glycol monomethyl ether acetate was added. The reaction temperature was held at 110° C. for 1.0 hour and then reheated to 150° C. The reaction was completed after 10 additional hours at 150° C. The product gelled to a solid mass in a few days.

EXAMPLE 12

121.4 g isophorone diisocyanate, 42.6 g DESMODUR N-3200 aliphatic polyisocyanate and 9.0 g of a 10% solution of 3-methyl-1-phenyl-2-phospholene-1-oxide in xylene were placed into a 1-liter, 4-neck, round-bottom flask equipped with a heating mantle, thermometer, condenser, nitrogen sparge and mechanical stirrer. The mixture was heated with stirring and nitrogen sparge at 145° C. After 1.5 hours reaction, a mixture of 12.1 g n-butanol, 89.6 g methoxy polyethylene glycol 350 and 180.0 g propylene glycol monomethyl ether acetate was charged into the flask. Then a mixture of 19.4 g toluene diisocyanate and 100.0 g propylene glycol monomethyl ether acetate was added. The reaction temperature was held at 110° C. for 1.0 hour and then reheated to 150° C. The reaction was completed after 12 additional hours at 150° C. The product had a solids content of 50.8%, a viscosity of 100 cps. and a color of 3 using a Gardner Hellige Comparator.

EXAMPLE 13

134.8 g isophorone diisocyanate and 9.0 g of a 10% solution of 3-methyl-1-phenyl-2-phospholene-1-oxide in xylene were placed into a 1-liter, 4-neck, round-bottom flask equipped with a heating mantle, thermometer, condenser, nitrogen sparge and mechanical stirrer. The mixture was heated with stirring and nitrogen sparge at 145° C. After 2.5 hours reaction, a mixture of 21.6 g n-butanol, 96.0 g methoxy polyethylene glycol 750 and 160.0 g propylene glycol monomethyl ether acetate was charged into the flask, corresponding to about 0.3 mol of monofunctional isocyanate-reactive compound per mol of isocyanate moiety. Then a mixture of 21.9 g toluene diisocyanate and 100.0 g propylene glycol monomethyl ether acetate was added. The reaction temperature was held at 110° C. for 1.0 hour and then reheated to 150° C. The reaction was completed after 10 additional hours at 150° C. The product had a solids content of 49.4%, a viscosity of 42 cps. and a color of 4.

EXAMPLE 14

111.8 g isophorone diisocyanate and 8.0 g of a 10% solution of 3-methyl-1-phenyl-2-phospholene-1-oxide in xylene were placed into a 1-liter, 4-neck, round-bottom flask equipped with a heating mantle, thermometer, condenser, nitrogen sparge and mechanical stirrer. The mixture was heated with stirring and nitrogen sparge at 145° C. After 2.5 hours reaction, a mixture of 21.55 g n-butanol, 96.0 g methoxy polyethylene glycol 750 and 160.0 g propylene glycol monomethyl ether acetate was charged into the flask. Then a mixture of 21.94 g toluene diisocyanate and 100.0 g propylene glycol monomethyl ether acetate was added. The reaction temperature was held at 110° C. for 1.0 hour and then reheated to 150° C. The reaction was completed after 10 additional hours at 150° C. The product had a solids content of 47.8%, a viscosity of 37 cps. and a color of 4.

EXAMPLE 15

181.5 g isophorone diisocyanate and 12.0 g of a 10% solution of 3-methyl-1-phenyl-2-phospholene-1-oxide in xylene were placed into a 1-liter, 4-neck, round-bottom flask equipped with a heating mantle, thermometer, condenser, nitrogen sparge and mechanical stirrer. The mixture was heated with stirring and nitrogen sparge at 145° C. After 2.5 hours reaction, a mixture of 48.8 g dibutyl amine (DBA), 124.8 g methoxy polyethylene glycol 750 and 234.0 g propylene glycol monomethyl ether acetate was charged into the flask. Then a mixture of 47.4 g toluene diisocyanate and 130.0 g propylene glycol monomethyl ether acetate was added. The reaction temperature was held at 110° C. for 1.0 hour and then reheated to 150° C. The reaction was completed after 10 additional hours at 150° C. The product had a solids content of 52.2%, a viscosity of 111 cps. and a color of 4.

EXAMPLE 16

181.4 g isophorone diisocyanate and 13.0 g of a 10% solution of 3-methyl-1-phenyl-2-phospholene-1-oxide in xylene were placed into a 1-liter, 4-neck, round-bottom flask equipped with a heating mantle, thermometer, condenser, nitrogen sparge and mechanical stirrer. The mixture was heated with stirring and nitrogen sparge at 145° C. After 2.5 hours reaction, a mixture of 21.0 g dibutyl amine, 116.5 g methoxy polyethylene glycol 350 and 230.0 g propylene glycol monomethyl ether acetate was charged into the flask. Then a mixture of 47.4 g toluene diisocyanate and 130.0 g propylene glycol monomethyl ether acetate was added. The reaction temperature was held at 110° C. for 1.0 hour and then reheated to 150° C. The reaction was completed after 10 additional hours at 150° C. The product had a solids content of 50.0%, a viscosity of 62 cps. and a color of 4.

EXAMPLE 17

190.7 g isophorone diisocyanate and 14.0 g of a 10% solution of 3-methyl-1-phenyl-2-phospholene-1-oxide in xylene were placed into a 1-liter, 4-neck, round-bottom flask equipped with a heating mantle, thermometer, condenser, nitrogen sparge and mechanical stirrer. The mixture was heated with stirring and nitrogen sparge at 145° C. After 2.5 hours reaction, a mixture of 37.5 g dibutyl amine, 96.0 g methoxy polyethylene glycol 750 and 200.0 g propylene glycol monomethyl ether acetate was charged into the flask. Then a mixture of 32.8 g toluene diisocyanate and 100.0 g propylene glycol monomethyl ether acetate was added. The reaction temperature was held at 110° C. for 1.0 hour and then reheated to 150° C. The reaction was completed after 8 additional hours at 150° C. The product had a solids content of 54.7%, a viscosity of 210 cps. and a color of 4.

EXAMPLE 18

147.6 g isophorone diisocyanate, 12.25 g of a 10% solution of 3-methyl-1-phenyl-2-phospholene-1-oxide in xylene and 89.3 g propylene glycol monomethyl ether acetate were placed into a 1-liter, 4-neck, round-bottom flask equipped with a heating mantle, thermometer, condenser, nitrogen sparge and mechanical stirrer. The mixture was heated with stirring and nitrogen sparge at 145° C. After 2.0 hours reaction, a mixture of 24.6 g n-butanol, 109.5 g methoxy polyethylene glycol 750 and 130.2 g propylene glycol monomethyl ether acetate was charged into the flask. Then a mixture of 58.3 g toluene diisocyanate and 92.9 g propylene glycol monomethyl ether acetate was added. The reaction temperature was held at 110° C. for 1.5 hour and then reheated to 150° C. The reaction was completed after 10 additional hours at 150° C. The product had a solids content of 49.6%, a viscosity of 107 cps. and a color of 5.

EXAMPLE 19

138.8 isophorone diisocyanate, 12.14 g of a 10% solution of 3-methyl-1-phenyl-2-phospholene-1-oxide in xylene and 88.7 g propylene glycol monomethyl ether acetate were placed into a 1-liter, 4-neck, round-bottom flask equipped with a heating mantle, thermometer, condenser, nitrogen sparge and mechanical stirrer. The mixture was heated with stirring and nitrogen sparge at 145° C. After 2.0 hours reaction, a mixture of 24.6 g n-butanol, 109.5 g methoxy polyethylene glycol 750 and 129.4 g propylene glycol monomethyl ether acetate was charged into the flask. Then a mixture of 65.2 g toluene diisocyanate and 92.4 g propylene glycol monomethyl ether acetate was added. The reaction temperature was held at 110° C. for 1.0 hour and then reheated to 150° C. The reaction was completed after 10 additional hours at 150° C. The product had a solids content of 49.5, a viscosity of 130 cps. and a color of 6.

TABLE 1

| | | | Raw Material Weights | | | | | | |
|---|---|---|---|---|---|---|---|---|---|
| Ex. # | IPDI | MPEG350 | MPEG750 | N-3200 | TDI | BuOH | DBA | Fctlty. | Aromatic[1] Aliphatic |
| 1 | 181.5 | 116.5 | | | 56.9 | 15.7 | | 3.2 | 0.40 |
| 2 | 167.5 | 89.6 | | | 21.9 | 12.0 | | 3.2 | 0.17 |
| 3 | 195.4 | 89.6 | | | 0.0 | 12.0 | | 3.2 | 0.00 |
| 4 | 139.6 | | 96.0 | | 72.8 | 21.0 | | 4.0 | 0.67 |
| 5 | 139.6 | | 96.0 | | 43.75 | 21.5 | | 3.2 | 0.40 |
| 6 | 167.5 | | 96.0 | | 21.9 | 21.5 | | 3.2 | 0.17 |
| 7 | 139.6 | | 96.0 | | 72.9 | 21.5 | | 4.0 | 0.67 |
| 8 | 153.2 | | 96.0 | | 32.9 | 21.6 | | 3.2 | 0.27 |
| 9 | 120.9 | | 96.0 | 56.8 | 12.9 | 21.5 | | 3.6 | 0.14 |
| 10* | 93.1 | 89.6 | | 75.0 | 43.7 | 12.0 | | 3.2 | 0.60 |
| 11 | 104.4 | 89.6 | | 56.8 | 36.8 | 12.1 | | 4.0 | 0.45 |
| 12 | 121.4 | 89.6 | | 42.6 | 19.4 | 12.1 | | 3.3 | 0.20 |
| 13 | 134.8 | | 96.0 | | 21.9 | 21.6 | | 2.5 | 0.21 |
| 14 | 111.8 | | 96.0 | | 21.9 | 21.6 | | 2.0 | 0.25 |
| 15 | 181.5 | | 124.8 | | 47.4 | | 48.8 | 3.0 | 0.33 |
| 16 | 181.4 | 116.5 | | | 47.4 | | 21.0 | 3.4 | 0.33 |
| 17 | 190.7 | | 96.0 | | 32.8 | | 37.5 | 4.0 | 0.22 |
| 18 | 147.6 | | 109.5 | | 58.3 | 24.6 | | 3.2 | 0.50 |
| 19 | 138.8 | | 109.5 | | 65.2 | 24.6 | | 3.1 | 0.60 |

*Sample gelled before the addition of MPEG, TDI and BuOH.
[1]Mol ratio of aromatic to aliphatic diisocyanates

EXAMPLE I

A base resin of an acrylic latex is prepared as follows:

A mixture of 192 g water and 48.0 g Butyl Cellosolve was added to 2000.0 g UCAR Vehicle 443. Then the pH of resin mixture was adjusted to 8.2 with a 14% ammonia water solution.

The various carbodiimides of Examples 1 to 17 and a commercial polycarbodiimide product (XL-25SE) were added into the resin mixture at a level of 5% crosslinker solids to 100% resin solids. After forming a homogeneous dispersion, a film with 1 mil dry thickness was drawn on a Leneta chart and was baked at 85° C. for 30 minutes. A control also was tested having no added crosslinker. The test of MEK and ethanol (ETOH) double rubs was performed after the baked film was cooled at ambient temperature for a few hours. According to the double rub tests, a piece of cheesecloth is saturated with methyl ethyl ketone (MEK) or ethanol (ETOH), then rubbed on the substrate until penetration occurs. One back and forth rub is one double rub.

TABLE 2

| | Carbodiimide Experiments | | | | | |
|---|---|---|---|---|---|---|
| Example # | [End Capper] [NCO] | MPEG Wt. % | TDI Wt. % | Tri-NCO Wt. % | DOUBLE RUBS @ 85° C./30 Min. | |
| | | | | | MEK | ETOH |
| 1 | 0.24 | 31.44% | 15.35% | | 105 | 154 |
| 2 | 0.24 | 30.79% | 7.52% | | 75 | 122 |
| 3 | 0.24 | 30.16% | | | 65 | 73 |
| 4 | 0.20 | 29.09% | 22.09% | | gelled | |
| 5 | 0.24 | 31.90% | 14.54% | | 105 | 173 |
| 6 | 0.24 | 31.28% | 7.14% | | 100 | 160 |
| 7 | 0.20 | 29.09% | 22.09% | | gelled | |
| 8 | 0.24 | 31.61% | 10.83% | | 105 | 125 |
| 9 | 0.34 | 31.16% | 4.19% | 18.44% | 100 | 164 |
| 10* | 0.24 | 28.51% | 13.91% | 24.14% | gelled | |
| 11 | 0.25 | 29.90% | 12.28% | 18.95% | gelled | |
| 12 | 0.27 | 31.43% | 6.80% | 14.94% | 100 | 197 |
| 13 | 0.29 | 35.00% | 8.00% | | 103 | 150 |
| 14 | 0.33 | 38.20% | 8.73% | | 104 | 133 |
| 15 | 0.25 | 31.01% | 11.78% | | 110 | 187 |
| 16 | 0.22 | 31.80% | 12.94% | | 112 | 191 |
| 17 | 0.20 | 26.89% | 9.19% | | 105 | 182 |
| XL-25SE | | | | | 100 | 120 |
| Control | | | | | 35 | 72 |

*Sample gelled before the addition of MPEG, TDI and BuOH.

The composition of this invention has at least three advantages over the prior art: stability, economy and the improvement of solvent resistance. The stability is demonstrated by every example within the preferred range. The shelf life is six months or longer. The economic advantage is a result of the incorporation of toluene diisocyanate for some isophorone diisocyanate and of butanol or dibutyl amine for butyl isocyanate. The improvement of solvent resistance of a carbodiimide crosslinked film versus an uncrosslinked film is significant in both MEK and ethanol double rubs test (see Table 2). In particular, the majority of aliphatic-/aromatic polycarbodiimide crosslinkers demonstrate a substantial improvement in the ethanol resistance and a moderate improvement in the MEK resistance compared with the UCARLNK XL-25SE product, an aliphatic carbodiimide prepared using isophorene diisocyanate and butyl isocyanate.

Although the invention has been described in its preferred forms with a certain degree of particularity, it should be understood that this description has been made only by way of example and that numerous changes may be made without departing from the spirit and the scope of the invention.

We claim:

1. A method for preparing a mixed aliphatic/aromatic polycarbodiimide comprising:
   (a) polymerizing a saturated aliphatic diisocyanate or a saturated cycloaliphatic diisocyanate or a mixture thereof, optionally containing a polyfunctional isocyanate, in the presence of a polycarbodiimide polymerization catalyst to form a polycarbodiimide intermediate having free isocyanate groups;
   (b) reacting said polycarbodiimide intermediate with a monofunctional isocyanate-reactive compound or a mixture thereof in an amount insufficient to react with all of said free isocyanate groups, and
   (c) further polymerizing said polycarbodiimide intermediate in the presence of an aromatic diisocyanate and said catalyst under polycarbodiimide-forming conditions until essentially all of the isocyanate groups are depleted.

2. The method of claim 1 wherein said saturated aliphatic diisocyanate is selected from the group consisting of isophorone diisocyanate, 1,6-hexane diisocyanate, dicyclohexylmethane diisocyanate, trimethylene diisocyanate 1,4-tetramethylene diisocyanate, decamethylene diisocyanate, 1,12-dodecane diisocyanate, cyclohexane diisocyanates, cyclobutane-1,3-diisocyanate, and hexahydrotolylene-2,4 and 2,6-diisocyanates.

3. The method of claim 2 wherein the aromatic diisocyanate is selected from the group consisting of 4,4'-diisocyanotodiphenylmethane, toluene diisocyanates; naphthalene diisocyanates, and m-phenylene diisocyanate.

4. The method of claim 1 wherein the monofunctional isocyanate-reactive compound is selected from the group consisting of alkanols having 1 to 10 carbon atoms, benzyl alcohol; glycol ethers; glycol esters; aliphatic amines; dialiphatic amines, and mixtures thereof.

5. The method of claim 4 wherein said alkanol is selected from methyl alcohol, ethyl alcohol, isopropyl alcohol, n-butyl alcohol, sec-butyl alcohol, isoamyl alcohol, n-hexanol, cyclohexanol, 2-chloro-1-propanol, and 2-octanol.

6. The method of claim 1 wherein said monofunctional isocyanate-reactive compound is a methoxy polyethylene glycol or diethylene glycol mono-n-butyl ether.

7. The method of claim 1 wherein said catalyst is phosphorous compound selected from the group consisting of phospholines, phospholine oxides and sulfies, phospholidines and phospholidine oxides and sulfides.

8. The method of claim 7 wherein said catalyst is used in an amount between about 0.001 and 0.03 mol per mol of aliphatic diisocyanate, cycloaliphatic diisocyanate or mixture thereof.

9. The method of claim 1 wherein said polymerization step (a) is continued for between about 1 and 3 hours.

10. The method of claim 1 wherein between about 0.2 to 0.5 mol of said aromatic diisocyanate is used per mol of said aliphatic diisocyanate, cycloaliphatic diisocyanate or mixture thereof.

11. The method of claim 10 wherein between about 0.2 and 0.9 mol of monofunctional isocyanate-reactive compound is used per mol of isocyanate groups in said diisocyanates and optional polyfunctional isocyanate.

12. The method of claim 11 wherein said reaction between the polycarbodiimide intermediate and said monofunctional isocyanate-reactive compound is conducted at a temperature below 120° C.

13. The method of claim 4 wherein said glycol ether is an alkoxy-capped polyethylene glycol.

14. The method of claim 1 wherein said saturated aliphatic diisocyanate is isophorone diisocyanate and said aromatic diisocyanate is a toluene diisocyanate, in an amount of between about 0.2 to 0.5 mol of toluene diisocyanate per mol of isophorone diisocyanate, wherein said monofunctional isocyanate-reactive compound includes an alkanol having 1 to 10 carbon atoms and a methoxy polyethylene glycol in an amount of between 0.2 and 0.9 mol of monofunctional isocyanate-reactive compound per mol of isocyanate groups in said isophorone diisocyanate and toluene diisocyanate.

15. A storage stable mixed aliphatic/aromatic polycarbodiimide prepared by (a) polymerizing a saturated aliphatic diisocyanate, or a saturated cycloaliphatic diisocyanate or a mixture thereof, optionally containing a polyfunctional isocyanate, in the presence of a polycarbodiimide polymerization catalyst to form a polycarbodiimide intermediate having free isocyanate groups, (b) reacting said polycarbodiimide intermediate with a monofunctional isocyanate-reactive compound or mixture thereof in an amount insufficient to react with all of said free isocyanate groups, and (c) further reacting said polycarbodiimide intermediate in the presence of an aromatic diisocyanate and said catalyst under carbodiimide-forming conditions until essentially all of the isocyanate groups are depleted.

16. The polycarbodiimide of claim 15 wherein said saturated aliphatic diisocyanate comprises isophorone diisocyanate, said monofunctional isocyanate-reactive compound comprises a mixture of n-butyl alcohol and methoxy polyethylene glycol and said aromatic diisocyanate comprises toluene diisocyanate.

17. The polycarbodiimide of claim 16 wherein said toluene diisocyanate, is provided in an amount of between about 0.2 to 0.5 mol per mol of isophorone diisocyanate and, wherein said monofunctional isocyanate-reactive compound is provided in an amount of between about 0.2 and 0.9 mol per mol of isocyanate groups in said isophorone diisocyanate and toluene diisocyanate.

18. A cross-linkable composition comprising a mixture of an aqueous carboxyl-containing resin and a polycarbodiimide of claim 15.

19. A cross-linkable composition comprising a mixture of an aqueous carboxyl-containing resin and a polycarbodiimide of claim 16.

20. A cross-linkable composition comprising a mixture of an aqueous carboxyl-containg resin and a polycarbodiimide of claim 17.

* * * * *